United States Patent [19]
Miyata et al.

[11] Patent Number: 4,581,651
[45] Date of Patent: Apr. 8, 1986

[54] SMEAR REDUCTION IN SOLID STATE IMAGE PICKUP DEVICE CAMERA

[75] Inventors: Katsuro Miyata; Takashi Asaida, both of Kanagawa, Japan

[73] Assignee: Sony Corporation, Tokyo, Japan

[21] Appl. No.: 474,814

[22] Filed: Mar. 10, 1983

[30] Foreign Application Priority Data

Mar. 12, 1982 [JP] Japan .................. 57-39999

[51] Int. Cl.[4] ............................................. H04N 3/13
[52] U.S. Cl. .................................................. 358/213
[58] Field of Search ........................................ 358/213

[56] References Cited

U.S. PATENT DOCUMENTS

| | | | |
|---|---|---|---|
| 3,940,602 | 2/1976 | Lagnado | 358/213 |
| 4,040,092 | 8/1977 | Carnes | 358/213 |
| 4,055,836 | 10/1977 | Weimer | 358/213 |
| 4,278,999 | 7/1981 | Ganguly | 358/213 |
| 4,485,405 | 11/1984 | Bailey | 358/213 |
| 4,490,744 | 12/1984 | Levine | 358/213 |

*Primary Examiner*—Gene Z. Rubinson
*Assistant Examiner*—L. C. Schroeder
*Attorney, Agent, or Firm*—Eslinger, Lewis H.; Alvin Sinderbrand

[57] ABSTRACT

A charge-coupled device (CCD) camera with a smear reducer circuit is disclosed, which includes a CCD for generating a pickup signal, a memory for storing an extracted smear signal from the pickup signal and, a level selector circuit for cutting off a noise contained in the smear signal with level less than a predetermined level in the smear signals from the memory. The output of this level selector circuit is subtracted from the pickup signal to thereby obtain a pickup signal with the smear reduced as well as a noise component suppressed.

16 Claims, 27 Drawing Figures

SMEAR REDUCTION IN SOLID STATE IMAGE PICKUP DEVICE CAMERA

BACKGROUND OF THE INVENTION

1. Field of the Invention

The present invention generally relates to improvements of a charge-coupled device (CCD) camera. More specifically, this invention relates to a device for preventing erroneous operation of the camera due to smear.

2. Description of the Prior Art

First, an example of a prior art smear reducer circuit will be described with reference to FIG. 1. Reference numeral 20 denotes generally a solid state image pickup device such as a charge-coupled device (CCD) and the like. If the solid state image pickup device 20 is of a frame transfer-type, it generally consists of a photosensor section 1, a storage section 2 and an output register section 3. On the surface of the photosensor section 1 is projected an image of an object (not shown) passed through a lens system (not shown). Thus, in the photosensor section 1 is formed an image of charge corresponding to an incident light. After one field period, namely, 1/60 sec elapses, the charge image in the photosensor section 1 is transferred to the storage section 2. The charge image transferred to this storage section 2 is further transferred to the output register section 3 in which it is converted to a serial signal and is then delivered as a pickup output.

Figure 1:
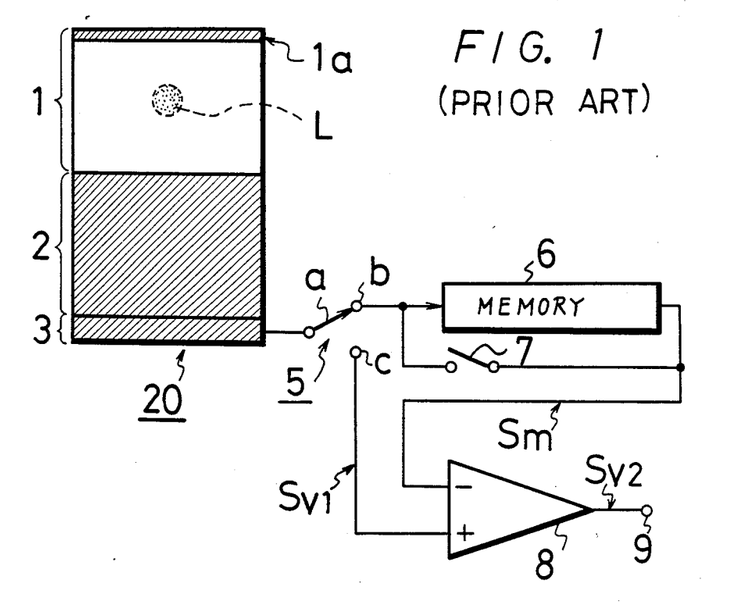
FIG. 1 is a block diagram showing an example of a prior art smear reducer circuit.
Figure 2:
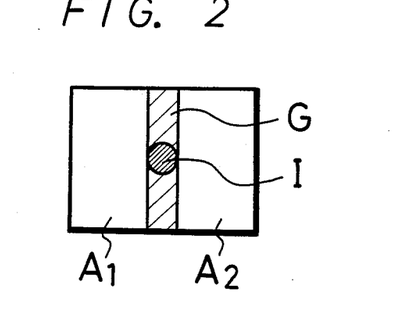
FIG. 2 is a schematic diagram showing an example of a reproduced picture screen useful for the explanation of the prior art smear reducer circuit of FIG. 1.

Now, let us assume that, as shown in FIG. 1, on a part of the photosensor section 1 a relatively bright light part L is incident and in that part a charge image is formed. Then, when the charge is transferred from the photosensor section 1 to the storage section 2, the charges accumulated in the respective portions of the photosensor section 1 are passed through this incident light part L and electrons excited by this light appear. Accordingly, when this pickup output is reproduced by a cathode ray tube incorporated in a television receiver, as illustrated in FIG. 2, a bright image I corresponding to the incident light part L of FIG. 1 is reproduced and a bright band-shape image G with a width same as that of the image I is also reproduced in the vertical direction. The brightness of this image G is lower than that of the image I. The charge image corresponding to such band-shape image G on the solid state image pickup device 20 is generally referred to as smear.

Therefore, in the prior art smear reducer circuit of FIG. 1, the smear is avoided as follows. The pickup output from the output register section 3 is supplied to a movable contact a of a change-over switch (electronic switch is preferred) 5. One fixed contact b of the change-over switch 5 is connected to the input side of a one-line memory 6. The output side of the memory 6 is connected through an on-off switch 7 to the input side thereof. Reference numeral 8 denotes a differential amplifier which acts as a subtracter. The other fixed contact c of the change-over switch 5 is connected to the noninverting input terminal of the differential amplifier 8 and the output side of the memory 6 is connected to the inverting input terminal thereof. Numeral 9 denotes an output terminal led out from the differential amplifier 8.

Figure 6A:
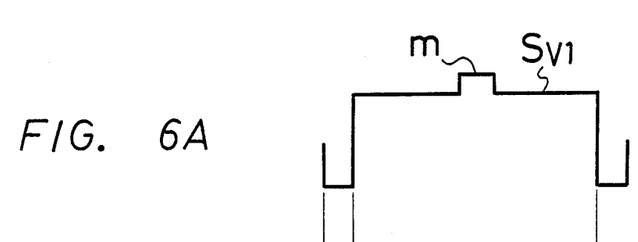
FIGS. 6A to 6C and FIGS. 7A to 7D are respectively waveform diagrams used to explain the operation of the smear reducer circuits of FIGS. 1 and 3.
Figure 6B:
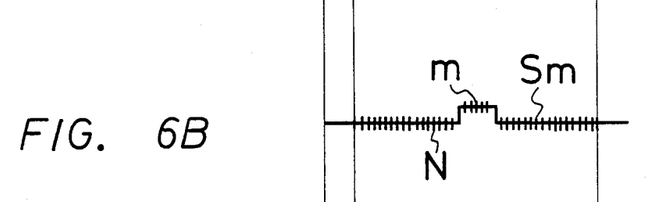
Figure 6C:
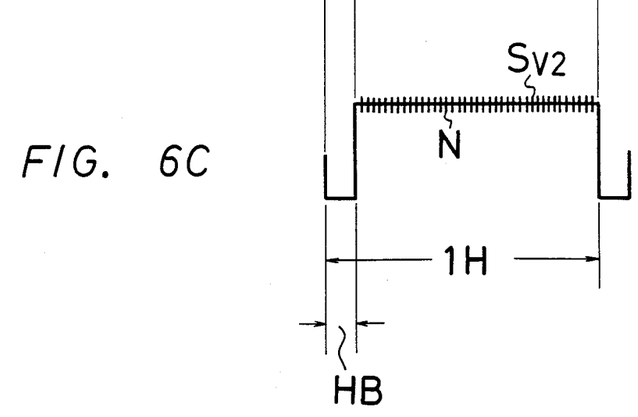

The operation of the smear reducer circuit of FIG. 1 will be described with reference to the waveform diagram of FIG. 6. In FIG. 1, a hatched area represents a mask for shielding a light. Particularly in the photosensor section 1, a light shielding or mask portion 1a is formed on, for example, its upper end (lower end is also possible). A pickup signal $S_{V1}$ (refer to FIG. 6A) derived from the solid state image pickup device 20 is supplied through the change-over switch 5 to the noninverting input terminal of the differential amplifier 8. This pickup signal $S_{V1}$ contains a smear component m. When a signal from the mask portion 1a of the photosensor section 1 is delivered from the output register section 3, the movable contact a of the change-over switch 5 is changed in position to the fixed contact b to supply a smear signal Sm (refer to FIG. 6B) formed of only the smear component m to the memory 6. At this time, since the on-off switch 7 is turned on during substantially one field period, the smear signal Sm is stored in the memory 6 during substantially one field period. The movable contact a of the change-over switch 5 is selectively connected to the fixed contact c thereof in other time interval than one line period during which the aforesaid smear signal Sm from the mask portion 1a is delivered. Thus, in the differential amplifier 8 the smear signal Sm is subtracted from the pickup signal $S_{V1}$ and then at the output terminal 9 a pickup signal $S_{V2}$ (refer to FIG. 6C) with the smear component removed is obtained. In FIG. 6, reference letter 1H represents one horizontal period and HB a horizontal blanking period.

By the way, in the prior art smear reducer circuit of FIG. 1, the smear signal Sm derived from the one-line memory 6 contains a noise N so that, as shown in FIG. 6C, the noise N is superimposed upon the pickup signal $S_{V2}$ finally obtained. Therefore, although the smear is reduced, a signal-to-noise (S/N) ratio of a reproduced picture screen is deteriorated.

OBJECTS AND SUMMARY OF THE INVENTION

Accordingly, it is an object of the present invention to provide a charge-coupled device (CCD) camera having an improved smear reducer circuit.

Another object of the present invention is to provide a CCD camera capable of producing an improved video signal.

Further object of the present invention is to provide a CCD camera which includes an improved smear reducer circuit with a memory of smear signal.

According to an aspect of the present invention, there is provided a charge-coupled device camera in which a light shielding portion of a solid stage image pickup device is used to detect a smear signal, said smear signal is stored in a memory means and a smear signal derived from said memory means is subtracted from a pickup signal to thereby perform a smear reducing operation, said charge-coupled device camera being characterized in that a level selector circuit means for selectively passing therethrough a smear signal of higher than a predetermined level is provided at the output side of said memory means.

The other objects, features and advantages of the present invention will become apparent from the following description taken in conjunction with the accompanying drawings through which the like references designate the same elements and parts.

DESCRIPTION OF THE PREFERRED EMBODIMENTS

Figure 3:
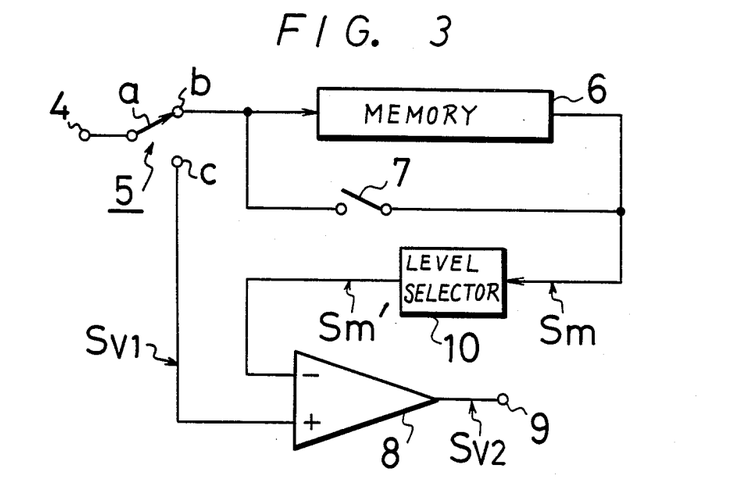
FIG. 3 is a block diagram showing an embodiment of a smear reducer circuit according to this invention.
Figure 4:
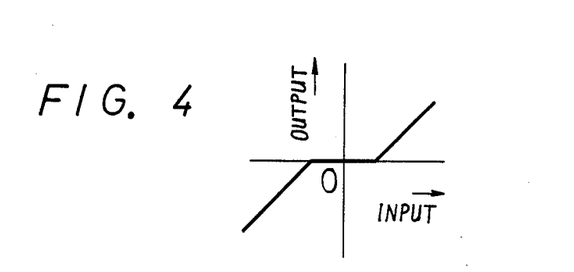
FIGS. 4 and 5 are respectively characteristic graphs showing an input/output characteristic of a level selector circuit which is used in the smear reducer circuit of FIG. 3.
Figure 5:
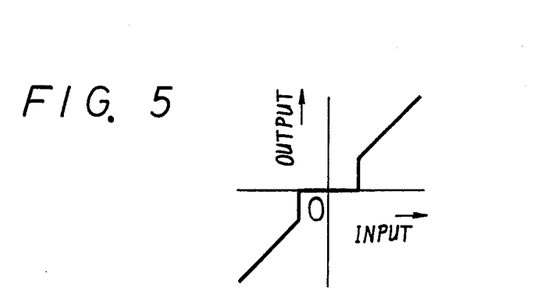

Now, preferred embodiments of the present invention will be described with reference to the attached drawings. Referring to FIG. 3, a first embodiment of the smear reducer circuit according to this invention will be described hereinafter. In FIG. 3, like parts corresponding to those of FIG. 1 are marked with the same references and the solid state image pickup device 20 of FIG. 1 is not shown for simplicity. According to this embodiment of the invention, the smear reducer circuit includes at the output side of the memory 6 a level selector circuit (coring circuit) for selectively delivering a signal in the input signal with a predetermined level or above as its output signal. The output signal from this level selector circuit 10 is supplied to the inverting input terminal of the differential amplifier 8. The input and output characteristics of the level selector circuit 10 are respectively shown in the graphs of FIGS. 4 and 5. The graph of FIG. 4 illustrates such characteristic in which when the input signal is less than the predetermined level, the output signal from the level selector circuit 10 is zero, while when the input signal exceeds the predetermined level, the input signal becomes the output signal of the level selector circuit 10 as it is. Whereas, the graph of FIG. 5 illustrates such characteristic in which when the level of the input signal is less than the predetermined value, the level of the output signal becomes zero, when the input signal reaches the predetermined level, the level of the output signal becomes a certain value at positive or negative, and when the input signal exceeds the predetermined value, the input signal directly becomes the output signal, respectively.

Figure 7A:
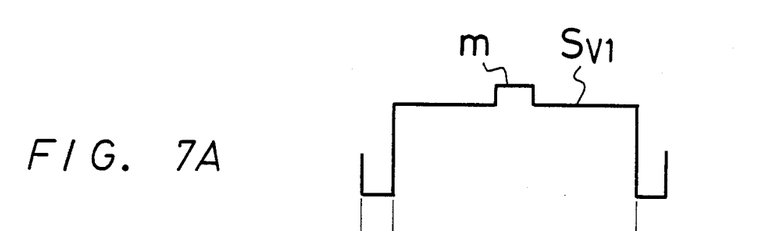
Figure 7B:
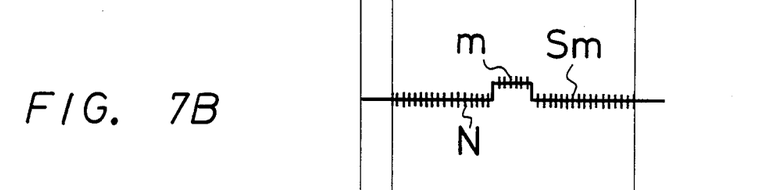
Figure 7C:
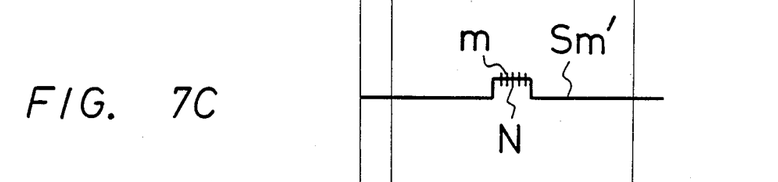
Figure 7D:
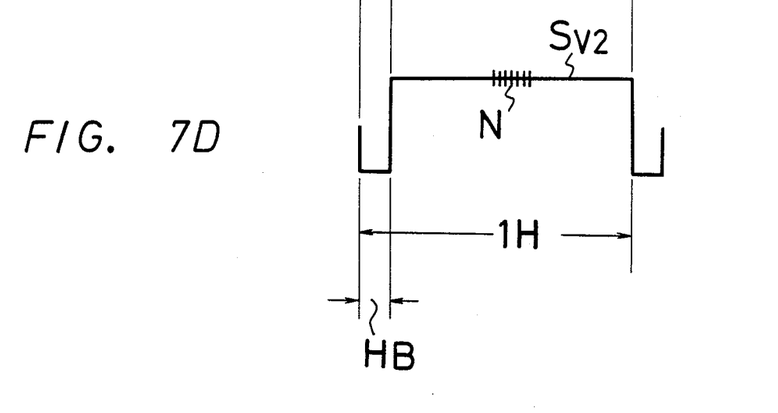

Subsequently, the operation of the smear reducer circuit of FIG. 3 will be described with reference to waveform diagrams of FIG. 7. FIG. 7A shows the pickup signal $S_{V1}$ which is applied to the input terminal 4 from the solid state image pickup device 20 (not shown). In the figure, reference letter m designates the smear component. FIG. 7B illustrates the smear signal Sm which is the output from the memory 6, and in which reference letter m denotes the smear component and N a noise. This smear signal Sm is supplied to the level selector circuit 10 in which noises contained other portion than the smear component m are eliminated and a smear signal Sm' (FIG. 7C) of the smear component m containing the noise N only in the smear component m is produced, which is then fed to the inverting input terminal of the differential amplifier 8. Thus, a pickup signal $S_{V2}$ developed at the output terminal 9 contains the noise N of only the part associated with the smear component m so that the S/N ratio of the regions, $A_1$ and $A_2$ of both sides of the band-shape image G on the reproduced picture screen shown in FIG. 2 is improved.

Subsequently, with reference to FIG. 8, a second embodiment of the smear reducer circuit according to this invention will be described. In this embodiment, the output or smear signal Sm from the memory 6 is supplied to a low-pass filter 11 and to a compounder or subtracter 12. The output $S_1$ from the low-pass filter 11 is supplied to the subtracter 12 to be subtracted from the output Sm of the memory 6. The output $S_2$ from the subtracter 12 is supplied to the level selector circuit 10 whose output $S_3$ is fed to a compounder or adder 13 to which the output $S_1$ from the low-pass filter 11 is also applied so that the output $S_3$ from the level selector circuit 10 is added with the output $S_1$ from the low-pass filter 11. The added output Sm' therefrom is then fed to the inverting input terminal of the differential amplifier 8.

Referring to FIG. 9, the operation of the smear reducer circuit of FIG. 8 will be described. To the input terminal 4 is applied the pickup signal $S_{V1}$ as shown in FIG. 9A. The memory 6 produces at its output side the smear signal Sm containing the noise N as shown in FIG. 9B. This smear signal Sm is supplied to the low-pass filter 11 which then generates the signal $S_1$ with the noise N eliminated as well as the smear component m of which the waveform is blunted as shown in FIG. 9C. In the subtracter 12, the signal $S_1$ is subtracted from the smear signal Sm so that the signal $S_2$ (containing the noise N) as shown in FIG. 9D is produced. This signal $S_2$ is supplied to the level selector circuit 10 which then produces the signal $S_3$ with all the noises N of the signal $S_2$ cancelled out. In the compounder or adder 13, the signals $S_1$ and $S_3$ are added to each other to produce the smear signal Sm' having no noise N but with the smear component m only, as shown in FIG. 9F. This smear signal Sm' is supplied to the differential amplifier 8 thereby subtracted from the pickup signal $S_{V1}$, and so at the output terminal 9 is developed the pickup signal $S_{V2}$ without both the smear component m and the noise N, as shown in FIG. 9G.

In the aforesaid embodiments of the invention, regardless of the presence or absence of the smear component on the pickup signal from the solid state image pickup device, the differential amplifier 8 forming the subtracter is operated to subtract the smear signal from the pickup signal. Therefore, when no smear component exists or the level thereof is fairly small, if the smear reducing function is performed, the S/N ratio of the pickup signal with the smear reduced is rather deteriorated.

Figure 10:
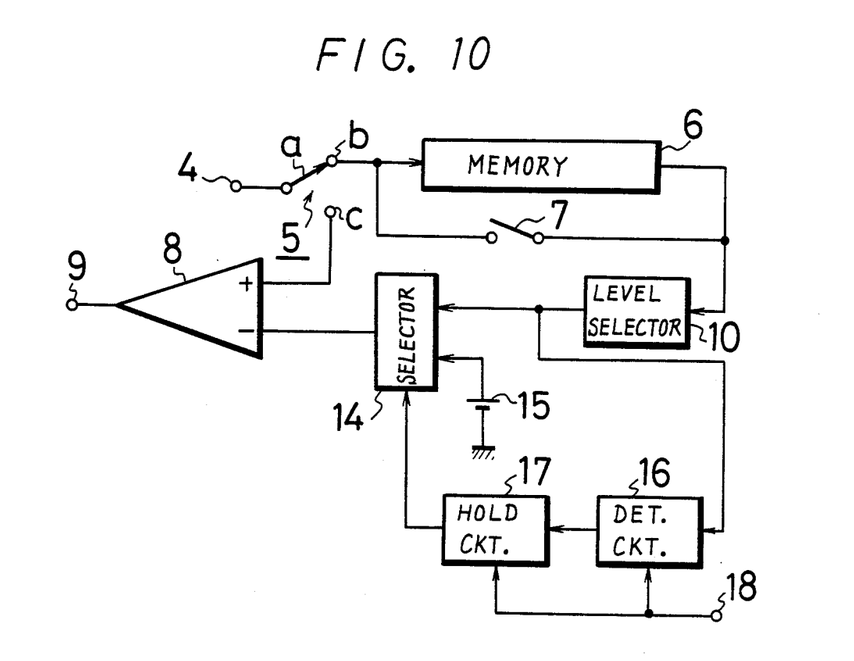
FIGS. 10 and 12 are respectively block diagrams showing further embodiments of the smear reducer circuit according to the present invention.

Then, a third embodiment of a smear reducer circuit according to the present invention in which such above defect is improved will be described with reference to FIG. 10. In FIG. 10, at the output side of the level selector circuit 10 is provided a selector 14 which selectively operates to directly supply the smear signal derived from the level selector circuit 10 to the inverting input terminal of the differential amplifier 8 when the pickup signal from the solid state image pickup device 20 (not shown) contains the smear component or to supply a reference voltage $E_0$ from a reference voltage source 15 to the inverting input terminal of the differential amplifier 8 when the pickup signal contains no smear component or a smear component of small level. To this end, the output from the level selector circuit 10 is supplied to a smear discriminator or detector circuit 16 and the output therefrom is supplied to a one-field hold circuit 17, the output of which is supplied to the selector 14 as its control signal. Further, a smear detection timing signal is applied from an input terminal 18 to the smear detector circuit 16 and one-field hold circuit 17.

Figure 11A:
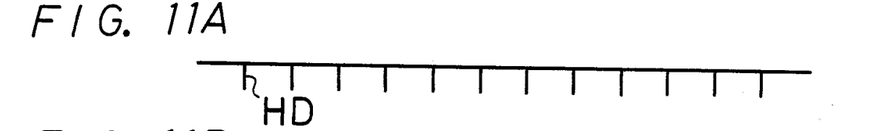
FIGS. 11A to 11D are respectively waveform diagrams used to explain the operation of the smear reducer circuit of FIG. 10.
Figure 11B:
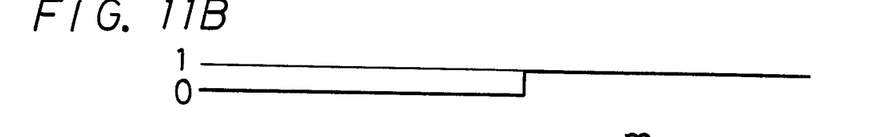
Figure 11C:
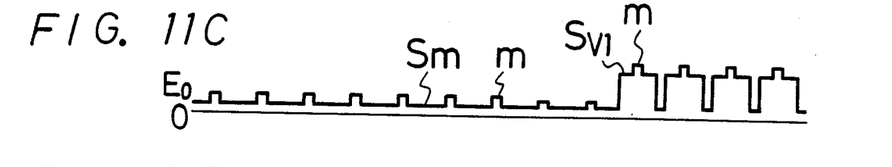
Figure 11D:
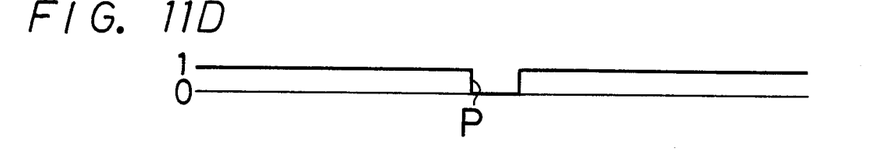

The operation of the improved smear reducer circuit shown in FIG. 10 will be described with reference to waveform diagrams of FIG. 11. FIG. 11A illustrates a horizontal synchronizing signal HD. FIG. 11B illustrates periods during which the smear signal Sm and the pickup signal $S_{V1}$ of the pickup output from the solid state image pickup device 20 are respectively obtained. In FIG. 11B, the level 0 denotes the smear signal period, while the level 1 denotes the pickup signal period. FIG. 11C illustrates the pickup output derived from the solid state image pickup device 20 in which reference letter m designates the smear component, Sm the smear signal and $S_{V1}$ the pickup signal, the pickup signal $S_{V1}$ containing the smear component m. FIG. 11D illustrates the aforesaid smear detection timing signal P which is a pulse associated with the last one horizontal period of the smear signal period. During this period, the level of the smear component m of the smear signal Sm is detected and if the detected level is beyond a predetermined level, it is judged that there is the smear and the smear detector circuit 16 produces the detected output. For the detection of the level of the smear signal Sm, it is sufficient that the adding sum of the detected peak value to the mean value of the smear signal Sm is produced, and when this adding sum is beyond the predetermined level, the smear detector circuit 16 produces the detected output.

In the above embodiment of FIG. 10, the reference voltage source 15 is provided to apply its reference voltage $E_0$ (refer to FIG. 11C) to the inverting input terminal of the differential amplifier 8 when the smear reducing operation is not necessary. This is because the black level of the pickup signal with the smear reduced must be prevented from being varied.

Figure 12:
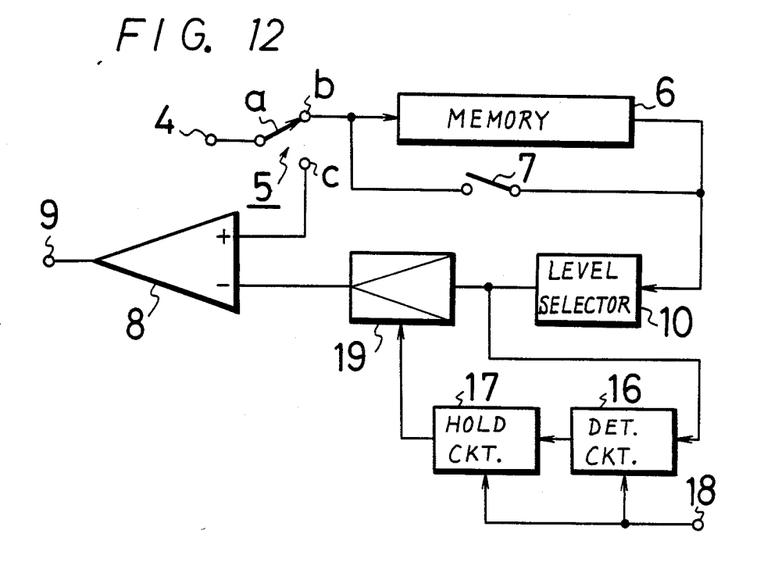
Figure 13:
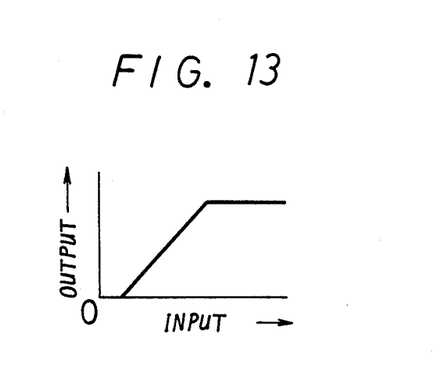
FIG. 13 is a characteristic graph used to explain the operation of the smear reducer circuit of FIG. 12.

While the aforesaid improved embodiment of FIG. 10 is the case where the smear reducing operation is performed depending on the judgement whether the smear level is above or below the predetermined value, it is also possible that, as shown in FIG. 12, the smear reduction amount may be varied in response to the smear level. In the embodiment of FIG. 12, the output from the level selector circuit 10 is supplied to the inverting input terminal of the differential amplifier 8 via a variable gain amplifier 19. Then, the detecting signal associated with the adding sum of the detected peak and mean values of the smear signal Sm from the smear detector circuit 16 is supplied through the one-field period hold circuit 17 to the variable gain amplifier 19 as its gain control signal whereby, in response to the level of the smear signal Sm, the level of the smear reducing signal, which is to be supplied from the level selector circuit 10 to the inverting input terminal of the differential smplifier 8, is varied. To be more concrete, as shown in FIG. 13, when the level of the smear signal Sm (that is, the input of the variable gain amplifier 19) is large, the level of the smear reducing signal (that is, the output from the variable gain amplifier 19) is selected large, when the level of the smear signal Sm is larger than the predetermined value, the level fo the smear reducing signal is selected as constant value L, while when the level of the smear signal Sm is small, the level of the smear reducing signal is selected small, and when the level of the smear signal Sm is smaller than the predetermined value, the level of the smear reducing signal is made zero.

Figure 8:
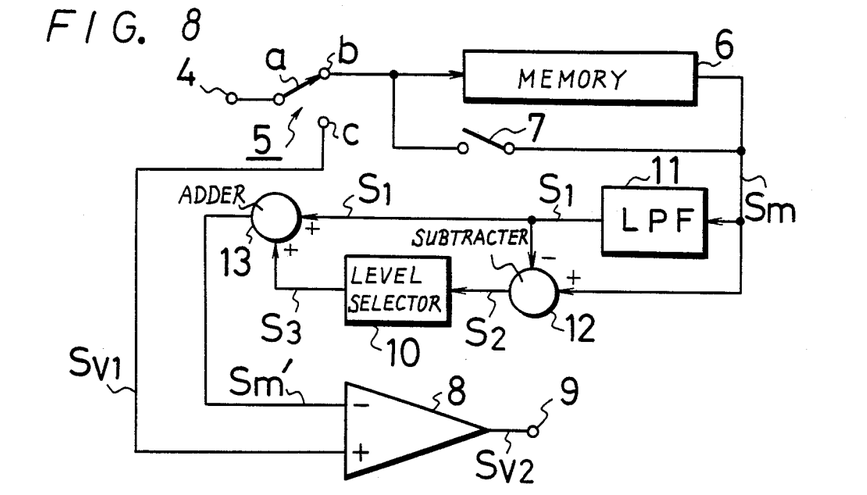
FIG. 8 is a block diagram showing another embodiment of the smear reducer circuit according to this invention.
Figures 9A, 9B:
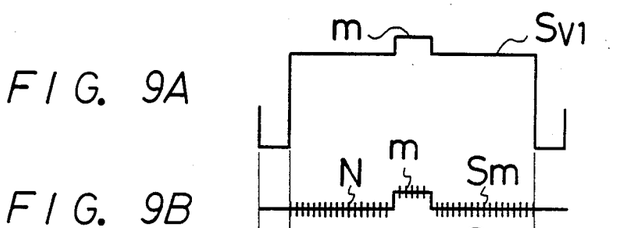
FIGS. 9A to 9G are respectively waveform diagrams useful for the explanation of the same.
Figure 9C:
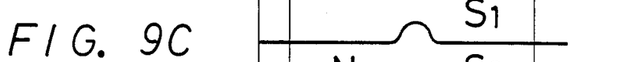
Figure 9D:
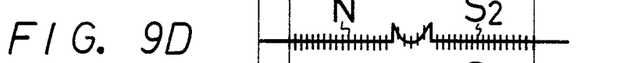
Figure 9E:
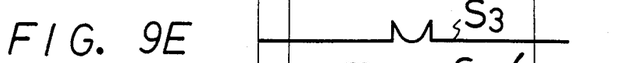
Figure 9F:
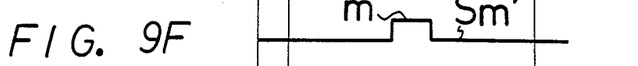
Figure 9G:
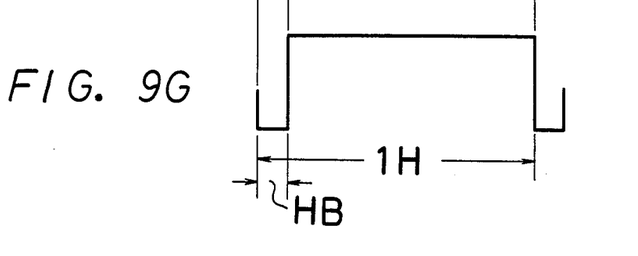

Furthermore, it is possible that the embodiment of FIG. 8 may be combined with the embodiment of FIGS. 10 or 11.

According to the present invention stated above, since the level selector circuit for selectively producing the input signal with the level higher than the predetermined level as its output signal is provided at the output side of the memory for storing the smear signal, the S/N ratio of pickup signal deteriorated by the smear reducing operation can be improved.

While in the above, the solid state image pickup device of frame transfer-type was described, it is needless to say that this invention can also be applied to a solid state image pickup device of interline transfer-type with the same effect.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. In a charge-coupled device camera in which a light shielding portion of a solid state image pickup is used to detect a smear signal, said smear signal is stored in a memory means and a smear signal derived from said memory means is subtracted from a pickup signal generated by said pickup device to thereby perform a smear reducing operation, the improvement comprising a level selector circuit means for selectively passing therethrough a smear signal of higher than a predetermined level, said smear signal having a smear component and a portion lying outside said smear component and having a noise component superimposed on said smear component and on said portion lying outside said smear component and said selector circuit means being connected to the output side of said memory means and substantially eliminating said noise component from at least the portion of said smear signal lying outside said smear component.

2. A charge-coupled device camera according to claim 1, wherein said level selector circuit means is a core circuit.

3. A charge-coupled device camera according to claim 1, wherein said solid state image pickup device is a frame transfer-type charge-coupled device.

4. A charge-coupled device camera according to claim 1, wherein said solid state image pickup device is an interline-type charge-coupled device.

5. In a charge-coupled device camera in which a light shielding portion of a solid state image pickup device is used to detect a smear signal, said smear signal is stored in a memory means and a smear signal derived from said memory means is subtracted from a pickup signal generated by said pickup device to thereby perform a smear reducing operation, the improvement comprising low-pass filter means connected to an output side of said memory means, subtracter means for subtracting an output of said low-pass filter means from an output of said memory means, level selector circuit means connected to an output side of said subtracter means, and adder means for adding an output from said level selector circuit means with the output of said low-pass filter means.

6. A charge-coupled device camera according to claim 5, wherein said level selector circuit means is a core circuit.

7. In a charge-coupled device camera in which a light shielding portion of a solid state image pickup device is used to detect a smear signal, said smear signal is stored in a memory means and a smear signal derived from said memory means is subtracted from a pickup signal generated by said pickup device to thereby perform a smear reducing operation, the improvement comprising a level selector circuit means for selectively passing therethrough a smear signal of higher than a predetermined level and which is connected to the output side of said memory means and a selector means connected to the output side of said level detector circuit means, said selector means being operated to select one of the output from said level selector circuit means and a predetermined D.C. level in response to the level of said smear signal.

8. A charge-coupled device camera according to claim 7, wherein said selector means detects a level of the smear signal from the output of said level selector circuit means and selects the output of said level selector circuit means when said level of the smear signal exceeds the predetermined level.

9. In a charge-coupled device camera in which a light shielding portion of a solid state image pickup device is used to detect a smear signal, said smear signal is stored in a memory means and a smear signal derived from said memory means is subtracted from a pickup signal generated by said pickup device to thereby perform a smear reducing operation, the improvement comprising a level selector circuit means for selectively passing therethrough a smear signal of higher than a predetermined level and which is connected to the output side of said memory means and a level varying means connected to the output side of said level selector circuit means, said level varying means varying said level of the smear signal from said level selector circuit means.

10. A charge-coupled device camera according to claim 9, wherein said level varying means detects the level of the smear signal from the output of said level selector circuit means and is controlled in response to the detected level of said smear signal.

11. A charge-coupled device camera comprising:
solid state image pickup means for generating a pickup signal in response to an image projected thereon, said pickup means including a light shielding portion for detecting a smear signal included in said pickup signal, said smear signal having a smear component and a portion lying outside said smear component and having a noise component superimposed on said smear component and on said portion lying outside said smear component;
memory means for storing said smear signal;
level selector means responsive to said memory means for substantially eliminating said noise component from at least the portion of said smear signal lying outside said smear component and for selectively supplying said smear signal from said memory means when said smear signal exceeds a predetermined level; and
subtractor means for subtracting the selected smear signal from said pickup signal.

12. A charge-coupled device camera comprising:
solid state image pickup means for generating a pickup signal in response to an image projected thereon, said pickup means including a light shielding portion for detecting a smear signal included in said pickup signal;
memory means for storing said smear signal;
level selector means for selectively supplying said smear signal from said memory means when said smear signal exceeds a predetermined level;
subtracter means for subtracting the selected smear signal from said pickup signal;
low-pass filter means for producing a filtered signal from said smear signal stored in said memory means;
second subtracter means for subtracting said filtered signal from said smear signal as supplied from said memory means to produce a difference signal;
level selector means for receiving said difference signal and generating a level selected signal therefrom; and
adding means for adding said filtered signal and said level selected signal to supply an added signal to the first-mentioned subtracter means.

13. A charge-coupled device camera comprising:
solid state image pickup means for generating a pickup signal in response to an image projected thereon, said pickup means including a light shielding portion for detecting a smear signal included in said pickup signal;
memory means for storing said smear signal;
level selector means for selectively supplying said smear signal from said memory means when said smear signal exceeds a predetermined level;
subtracter means for subtracting the selected smear signal from said pickup signal;
reference voltage source means for generating a reference voltage; and
selector means for supplying one of said reference voltage and said selected smear signal to said subtracter means.

14. The charge-coupled device camera of claim 13; and further comprising means for detecting the level of said selected smear signal and generating a control signal for said selector means whereby said selector means supplies said selected smear signal when said level thereof exceeds said reference voltage.

15. The charge-coupled device camera of claim 14; wherein said means for detecting comprises detecting circuit means for detecting said level of said smear signal, and a one-field holding circuit means connected to said detecting circuit for supplying said control signal to said selector means.

16. A charge-coupled device camera comprising:
solid state image pickup means for generating a pickup signal in response to an image projected thereon, said pickup means including a light shielding portion for detecting a smear signal included in said pickup signal;
memory means for storing said smear signal;

level selector means for selectively supplying said smear signal from said memory means when said smear signal exceeds a predetermined level;
subtracter means for subtracting the selected smear signal from said pickup signal;
means for detecting the level of said selected smear signal and generating a control signal in response thereto; and
variable gain amplifier means for applying gain to said selected smear signal, the amount of said gain varying in response to said control signal.

* * * * *